Apr. 24, 1923.

H. L. JACKSON

HANDWHEEL GRIP

Filed Dec. 20, 1921

1,453,012

INVENTOR

Harry L. Jackson
John A. Chaismith
BY
ATTORNEY

Patented Apr. 24, 1923.

1,453,012

UNITED STATES PATENT OFFICE.

HARRY L. JACKSON, OF PALO ALTO, CALIFORNIA.

HANDWHEEL GRIP.

Application filed December 20, 1921. Serial No. 523,657.

*To all whom it may concern:*

Be it known that I, HARRY L. JACKSON, a citizen of the United States, and resident of Palo Alto, in the county of Santa Clara and State of California, have invented certain new and useful Improvements in Handwheel Grips, of which the following is a specification.

In the ordinary operation of the hand wheel of an automobile, especially of a truck or heavy touring car, a decided turn can only be made as a rule by repeatedly releasing the wheel and securing a fresh grip in another place further on around its circumference. The steering of a car or truck is particularly difficult in sandy or soft ground, and in making a turn under such conditions it is frequently necessary to release the wheel to secure a better grip, just at a time when continued movement of the wheel would secure the best results.

It is the object of my invention to provide a device that may be readily mounted upon a hand wheel and secured thereto whereby a grip is provided that will permit the proper manipulation of the hand wheel under the above stated conditions.

In the drawings,—

Figure 3:
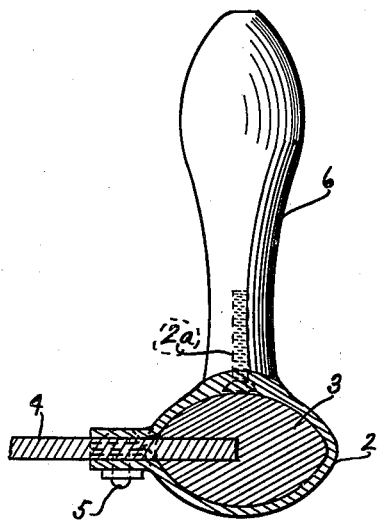
Figure 3 is a sectional view on line 3—3 of Figure 2.

Referring more particularly to the drawing, 1 indicates a hand wheel of a motor vehicle. At 2 I show a body member having a contour adapted to engage the wheel rim 3 and one spoke 4. This member is preferably made of spring metal so that it may be forced into position on the rim, the inner edges automatically closing upon spoke 4. In this form the device is provided with bolts as 5 whereby it may be securely fastened in place. Mounted on body member 2 by means of bolt 2ᵃ is a handle 6, so arranged thereon as to extend upwardly therefrom at right angles to the plane of the wheel.

The device is attached to the wheel by merely forcing on the rim to engage the rim and spoke and inserting bolts 5.

With one or more of these devices positioned on a wheel as described more power may be effectively applied to turning the same and with less effort than with a plain wheel.

With devices of this kind mounted on a wheel the same may be manipulated through an arc of approximately one hundred and eighty degrees with comparative ease by merely shifting the hand once. With a plain wheel it would be necessary to shift the hand several times to secure the same result.

Figure 4:
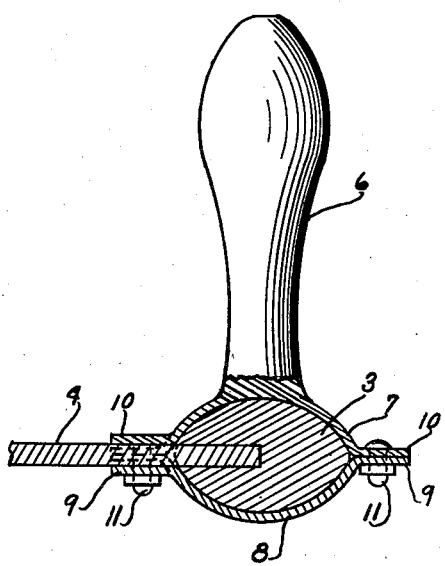
Figure 4 is a sectional view through another embodiment of my invention.
Figure 1:
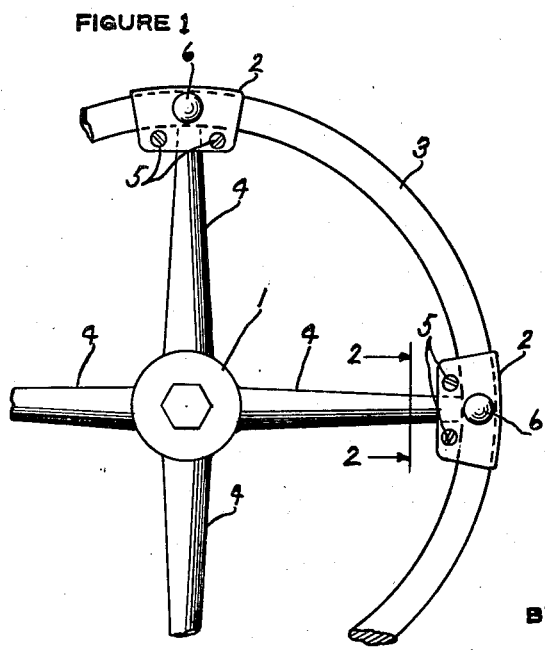
Figure 1 is a plan view of a portion of the hand wheel of an automobile having two devices embodying my invention mounted thereon.
Figure 2:
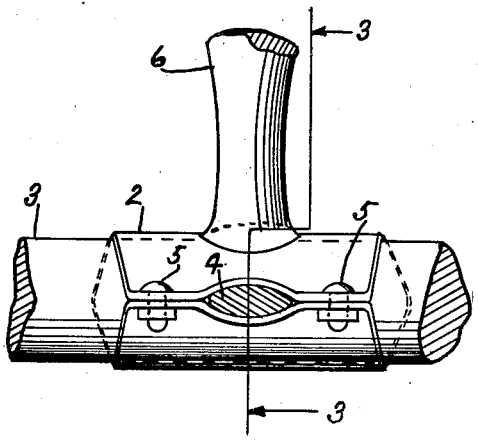
Figure 2 is a sectional view on line 2—2 of Figure 1.

In Figure 4 I show an embodiment in which the body portion is formed of two parts as 7 and 8 provided with flanges as 9 and 10 secured together by means of bolts 11. In this embodiment the handle 6 is formed integrally with body member 2.

It is to be understood, of course, that while I have herein shown and described the preferred embodiments of my invention, changes in form, construction and method of operation may be made within the scope of the appended claims.

I claim:—

1. A device of the character indicated comprising a resilient member having an inner contour adapted to engage the rim of a hand wheel and separable along one side to permit its engagement with said wheel, opposed flanges carried by the separable portions of said member, said flanges being formed to engage a spoke of said wheel, means for securing said flanges to said spoke, and a handle mounted on said member.

2. A device of the character indicated comprising a resilient member having an inner contour adapted to engage the rim of a hand wheel and separable along one side to permit its engagement with said wheel, spoke engaging means carried by said member, and a handle mounted on said member.

HARRY L. JACKSON.